(12) United States Patent
Willibey

(10) Patent No.: US 6,715,786 B1
(45) Date of Patent: Apr. 6, 2004

(54) FABRIC VALVE

(75) Inventor: Douglas D. Willibey, Chandler, AZ (US)

(73) Assignee: Zodiac Automotive US Inc., Tempe, AZ (US)

( * ) Notice: Subject to any disclaimer, the term of this patent is extended or adjusted under 35 U.S.C. 154(b) by 1 day.

(21) Appl. No.: 10/026,554

(22) Filed: Dec. 27, 2001

(51) Int. Cl.⁷ ............................................... B60R 21/24
(52) U.S. Cl. .................... 280/729; 280/730.2; 280/739; 280/749
(58) Field of Search .............................. 280/730.2, 749, 280/739, 743.1, 729; 37/496, 329.1, 329.2, 846, 855

(56) References Cited

U.S. PATENT DOCUMENTS

| | | |
|---|---|---|
| 3,907,328 A | 9/1975 | Werman |
| 3,910,595 A | 10/1975 | Katter et al. |
| 3,937,258 A | 2/1976 | Loomba |
| 4,758,198 A | 7/1988 | Ishiwa |
| 5,209,264 A | 5/1993 | Koyanagi |
| 5,322,322 A | 6/1994 | Bark et al. |
| 5,458,366 A | 10/1995 | Hock et al. |
| 5,480,181 A | 1/1996 | Bark et al. |
| 5,901,979 A | 5/1999 | Schneider et al. |
| 5,957,493 A | 9/1999 | Larsen et al. |
| 6,059,312 A | 5/2000 | Staub et al. |
| 6,126,686 A | 10/2000 | Badylak et al. |
| 6,152,481 A | 11/2000 | Webber et al. |
| 6,158,767 A | 12/2000 | Sinnhuber |
| 6,176,512 B1 | 1/2001 | Rodriguez |
| 6,213,499 B1 * | 4/2001 | Khoudari et al. ............ 280/729 |
| 6,402,190 B1 * | 6/2002 | Heudorfer et al. ........ 280/728.1 |
| 2001/0003395 A1 | 6/2001 | Ariyoshi |

FOREIGN PATENT DOCUMENTS

JP 4-244453 * 9/1992 .............. 280/743.1

OTHER PUBLICATIONS

International Search Report PCT/US02/38603, Simula, Inc.

* cited by examiner

Primary Examiner—Eric Culbreth
(74) Attorney, Agent, or Firm—ShawPittman L.L.P.

(57) ABSTRACT

A fabric valve is disclosed that is made of a fabric blank folded in a pattern that promotes the flow of fluid in one direction along an axis of the fabric valve but restricts the flow in the opposite direction along the same axis. The fabric valve is easy to construct and is made by a series of folds. The fabric valve may be particularly suitable for use with inflatable safety devices used in vehicles, such as air bags and air curtains, to restrict backflow of gas from a given air bag when pressure, is applied to the bag. A method of making the fabric valve and a system incorporating the fabric valve are also disclosed.

29 Claims, 7 Drawing Sheets

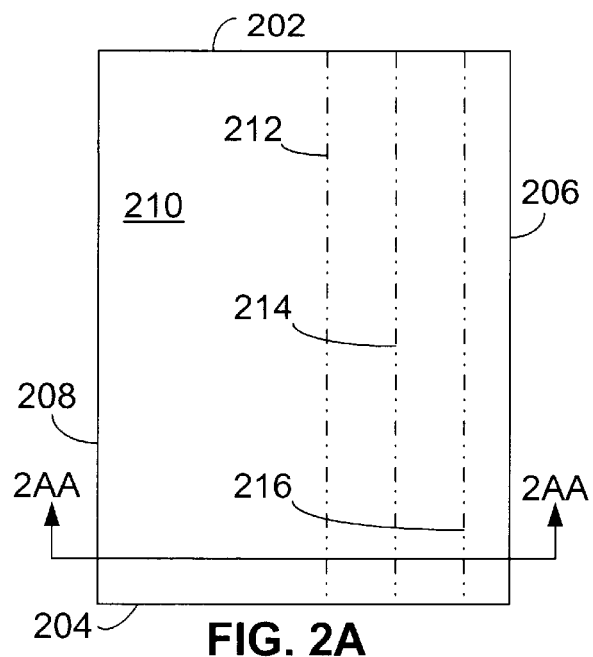
FIG. 2A
FIG. 2AA
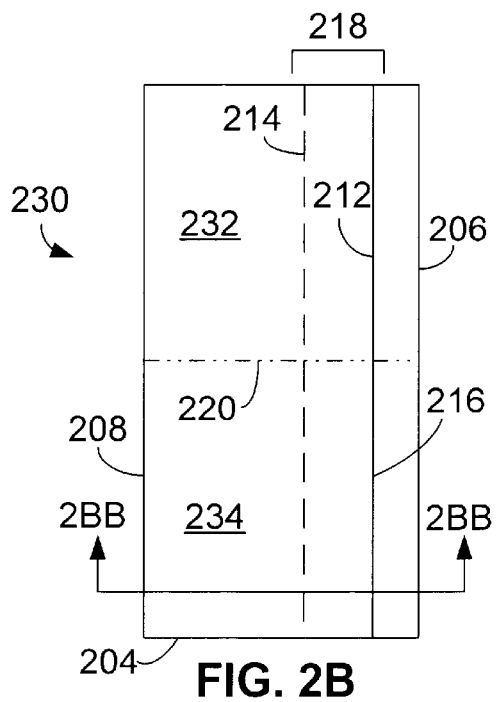
FIG. 2B
FIG. 2BB

FABRIC VALVE

BACKGROUND

1. Field of the Invention

The present invention relates to a fabric valve, and more particularly, to a fabric valve for use in air bags or similar vehicular safety devices.

2. Background of the Invention

Modern passenger vehicles are manufactured with a number of safety features that are designed to minimize passenger injury in accidents. Such features include, for example, rollover bars, uni-body construction, seat belts, and inflatable devices, such as, for example, air bags and air curtains. Inflatable devices generally remain in an inactive compressed condition until an impact or other physical stimulus activates such devices to inflate to protect passengers during an accident.

Thus the term "inflatable devices" will be used throughout this disclosure to describe devices that typically are in an inactive compressed state until a trigger activates them to become inflated. Such devices include, but are not limited to, air bags, air curtains, inflatable tubular structures, and air walls. Inflatable devices generally have an inflatable structure in fluid communication with a source of compressed gas or a gas generator, which, upon activation, releases gas into the inflatable structure.

Some conventional air bag systems have multiple bags and gas inflatable compartments, thereby allowing for different and typically layered cushion zones to handle soft and hard passenger impacts. Valves may be used between these different cushion zones to control the amount of gas passable between the zones. These valves may be one-way valves that are simple in design, but may not be fully successful in preventing back flow of gas from a high pressure gas cushion zone to a lower pressure gas cushion zone. Thus, there is a need for a device that acts as a one-way valve to restrict the flow of gas to one direction.

SUMMARY OF THE INVENTION

The present invention is a fabric valve that is made of a fabric blank folded in a pattern that promotes the flow of fluid in one direction along an axis of the fabric valve, but restricts the flow in the opposite direction along the same axis. The valve is manufactured from, for example, a rectangular sheet of fabric. A series of simple folds are used to create a fabric valve that is then attached onto an inlet tube such that gas is only directed in one direction. The fabric valve prevents backflow of gas back through the valve by creating a wall of fabric that seals the valve when a higher pressure is sensed downstream of a moving lip mechanism on the valve.

An exemplary fabric valve implementing the present invention includes a fabric blank having a top edge, a left edge, a bottom edge, and a right edge. A Z-fold is created along the right edge thereby resulting in a Z-folded fabric blank. The Z-folded fabric blank is folded in half along a first traverse fold line that is parallel to the top and bottom edges to result in a bi-folded fabric blank. The bi-folded fabric blank is further folded in half along a second traverse fold line that is parallel to the top and bottom edges and the first traverse fold line to result in a quad-folded fabric blank. The fabric valve further has a first line of stitches parallel to the second traverse fold line. The first line of stitches secures a portion of the Z-fold at the second traverse fold line. The fabric valve also has a second line of stitches parallel to the first line of stitches. The second line of stitches secures another portion of the Z-fold at the first traverse fold line, the top edge, and the bottom edge. Fluid is restricted to flow through the quad-folded fabric blank only in a direction from the left edge to the right edge (and not vice-versa).

Another exemplary implementation of the present invention is an easy to follow method for making a fabric valve. First, a fabric blank having a top edge, a right edge, a bottom edge, and a left edge is selected. A Z-fold is created along the right edge to result in a Z-folded blank. The Z-folded blank is folded in half along a first traverse line perpendicular to the Z-fold to result in a half-size Z-folded blank. The half-size Z-folded blank is folded in half along a second traverse line perpendicular to the Z-fold to result in a quarter-size Z-folded blank. The quarter-size Z folded blank is secured along the second traverse line from the right edge across a width of the Z-fold. The quarter-size Z folded blank is secured along the first traverse line from the right edge to the left edge.

Yet another exemplary implementation of the present invention is an inflatable vehicular safety system that contains a fabric valve that promotes gas flow in one direction but restricts gas flow in the opposite direction. The system includes a first chamber that is adapted to receive gas from a gas generator. The system also includes a fabric valve having a body member and a Z-fold member. The body member includes four layers of a fabric blank and is adapted to receive a portion of the gas from the first chamber and to discharge the portion of gas out of the Z-fold member. The Z-fold member includes 12 layers of the fabric blank. The system also includes a second chamber upon which the fabric valve is attached, wherein the second chamber receives the portion of gas from the first chamber through the fabric valve. When the first chamber experiences a decrease in pressure, the Z-fold member prevents the portion of gas in the second chamber from returning to the first chamber.

BRIEF DESCRIPTION OF THE DRAWINGS

FIGS. 2A through 2E are explanatory views for explaining how the fabric valve shown in FIG. 1 may be made.

FIGS. 2AA through 2DD are side cut views of the fabric valve in FIGS. 2A through 2D, respectively.

DETAILED DESCRIPTION OF PREFERRED EMBODIMENTS

An exemplary embodiment of the present invention is a fabric valve for use in conjunction with an air bag or similar vehicular safety device. A typical vehicular safety device for use with the present invention is the Inflatable Tubular Structure ("ITS") manufactured by Simula, Inc. of Phoenix, Ariz. ITS is fully disclosed in U.S. Pat. Nos. 5,322,322 and 5,480,181 (both issued to Bark et al.), each of which is hereby incorporated herein by reference in its entirety.

The present invention may be adapted for use with other vehicular safety devices having two or more air chambers. For example, it may be used in any multi-chambered inflatable device wherein gas passes through the chambers and exists at different pressures in different chambers. A fabric valve according to the present invention would be suitable to restrict backflow between the chambers.

An exemplary embodiment of the present invention is a fabric valve that is designed for use in an air bag system in which a single gas generator fills an ITS through an inlet fill tube and also fills a separate curtain-style (i.e., curtain type) air bag. Gas fills the ITS by entering a bladder of the ITS through the fill tube and fabric valve, but is restricted by the fabric valve from flowing back out of the bladder. Typically, an air bag only remains inflated for less than one second, whereas an ITS preferably remains inflated for a longer period. In this system, the curtain-style air bag may leak at a higher rate than the ITS, causing gas to flow out of the ITS and back into the curtain bag. Therefore, a valve that prevents backflow, such as the fabric valve described herein, may be required to increase the inflated time of the ITS in this air bag system.

Figure 1:
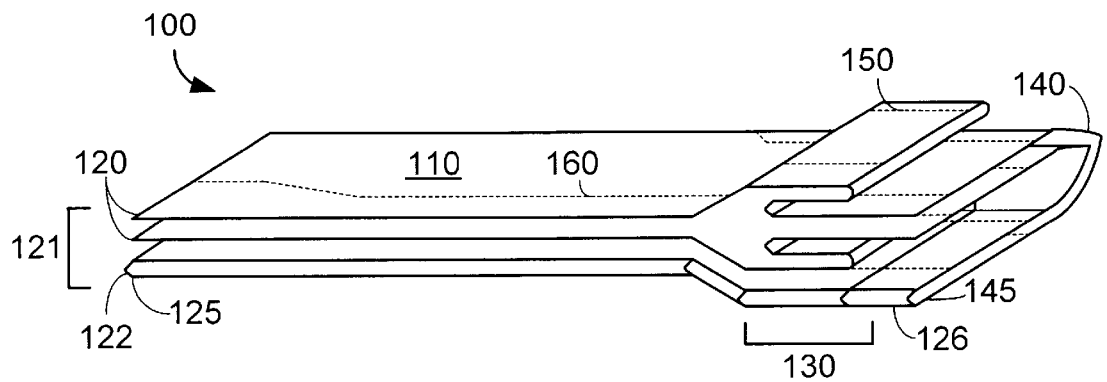
FIG. 1 is a schematic diagram showing an isometric view of an exemplary embodiment of the present invention.

FIG. 1 is a schematic diagram showing an isometric view of an exemplary embodiment of the present invention. Fabric valve 100 is folded in a unique configuration that is most advantageous to an airbag for which the fabric valve is designed. Fabric valve 100 includes one or more substantially planar sheets 110 of a fabric. Fabric valve 100 may comprise multiple layers 121, which may be multiple separate sheets 110 attached together or a single sheet 110 folded into multiple layers. The exemplary embodiment shown in FIG. 1 is a single sheet folded into multiple layers, but multiple separate sheets attached together by suitable adhering means, such as, for example, thread, adhesive, clips, or the like, also may be used. In the exemplary embodiment shown in FIG. 1, the single sheet 110 is folded to form at least two free ends 120 and a folded end 122. The fabric valve 100 has an inlet end 125 and an outlet end 126, a top side 140 and a bottom side 145. At the outlet end 126, there may be a multiple fold region having multiple folds 130. The multiple layers of the fabric valve 100 may be adhered together through adhering means, such as, for example, thread, adhesive, clips, or the like. In the exemplary embodiment shown, a top stitch 150 secures the top side of the fabric valve 100 and bottom stitch 160 secures the bottom side of the fabric valve. Other stitches also may be used. The stitches provide structural stability to the fabric valve by preventing disintegration of the valve at high pressures, and also serve to keep the valve closed when higher pressures are present downstream of the valve, described in more detail below.

The fabric valve 100 is a piece of fabric folded and attached to the end of the ITS fill tube. The fold pattern and stitching on the fabric valve 100 are dependent upon one or more factors. The factors are, for example, the nature of the fabric used, desired strength of valve, and anticipated fluid pressures and temperatures that would be encountered during deployment. For example, higher density stitching would be more desirable for higher strength fabrics. Such a fabric may be constructed of, but is not limited to, the same types of fabrics used in construction of an air bag or air curtain. Thus, a silicone-coated nylon fabric could be used. Heavier fabrics that may be used include a double side silicone-coated nylon. For the heavier fabrics, the stitching is usually denser to preserve the integrity of the fabric valve. The valve material and configuration are dependent upon the gas generator used in the air bag system. The temperature and pressure of the gas determines the fabric weight, coating weight, thread material, and sewing configuration. Multiple fabrics, thread materials, and stitch densities may be used to construct a valve according to each application.

Materials that may be needed to construct an exemplary embodiment of the fabric valve 100 include, but are not limited to, fabric, fabric coating, and thread. The fabric may be, for example, nylon, from about 420 denier to about 840 denier. The fabric coating may be applied on a single side or on both sides of the fabric. Such fabric coatings may be, for example, silicone, neoprene, or other such coatings. The thread used to stitch the fabric may be, for example, nylon, polyester, para-aramid (KEVLAR), or other such threads.

The seams in the fabric valve 100 may have varying stitch densities. For example, stitch densities of about six stitches per inch to about 20 stitches per inch may be used. One or more needles may be used to sew the seams. For example, a double needle may be used to create two parallel seams. A silicone sealant may be used to seal the threads at the stitch points. Alternatively, an adhesive may be used to promote the seal of the stitches or to adhere the layers of fabric together.

The fold geometry may vary from the exemplary embodiment shown in FIG. 1 without departing from the scope and spirit of the present invention. For example, alternative fold geometries may have: different lengths of segments; differing numbers of layers; different location and numbers of transverse folds; different number of folds in series; different lengths of materials on different sides of the folds; and different widths of the folds; or the like, without departing from the scope and spirit of the present invention.

The variables described above are tuning parameters, which can be utilized to modify the valve design based upon a desired need. For example, a higher temperature and pressure gas may require a higher denier fabric with heavier coating and a double needle seam with sealant. Based on the operating pressure, the fold geometry (length, number of folds, etc.) may be changed.

Figure 2C:
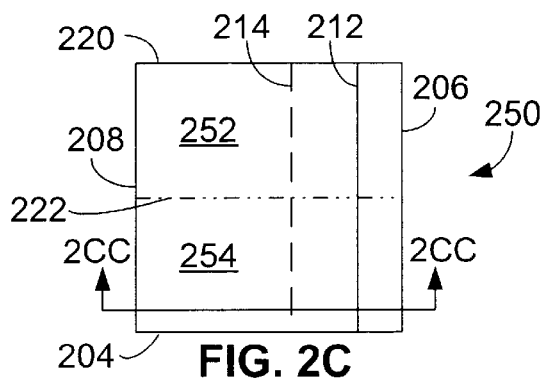
Figure 2C:
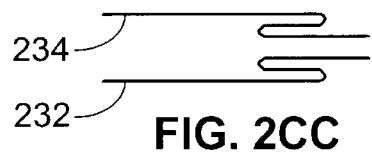
Figure 2D:
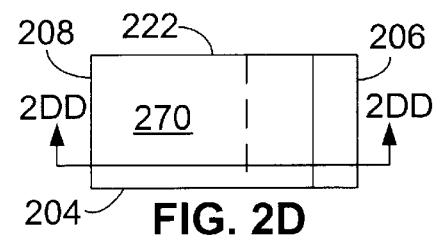
Figure 2D:
Figure 2E:
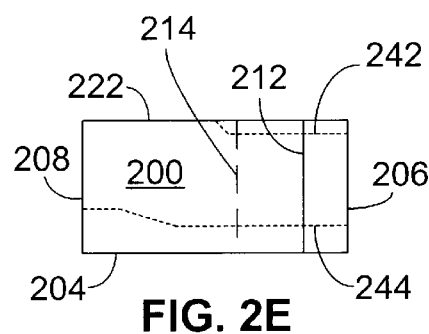

FIGS. 2A through 2D, and 2AA through 2DD, are explanatory views for showing how a fabric valve 200 shown in FIG. 2E may be made. Fabric valve 200 comprises a fabric blank 210, which may be of a suitable size and material to communicate with a corresponding ITS (not shown). Preferably, the fabric blank 210 has a rectangular shape with a top edge 202, a bottom edge 204, a left edge 208, and a right edge 206. For example, each of the left 208 and right 206 edges is about 260 mm long, and each of the top 202 and bottom 204 edges is about 140 mm wide. Depending on the number of folds, length of folds, and seam geometry, these dimensions may range from about 60 mm to about 600 mm in width, and from about 200 mm to about 500 mm in length.

A Z-fold 218 is created along the right edge 206 (see FIGS. 2B and 2BB). For example, the Z-fold 218 is located approximately 15 mm from the right edge 206. This results in a Z-folded fabric blank 230 having a width of about 90 mm, which is about 50 mm narrower than the unfolded fabric blank 210. The "missing" 50 mm is overlapping within the Z-fold 218. In other words, a first Z-fold line 212 is located about 75 mm from the left edge 208 to facilitate the fabric blank 210 to be folded downwards along the first Z-fold line 212. A second Z-fold line 214 is located about 25 mm to the left of the first Z-fold line 212 to facilitate the fabric blank 210 to be folded downward along the second Z-fold line 214. The remaining 15 mm of the fabric blank closest to the right edge 206 is exposed to the right of the first Z-fold line 212. As shown in FIGS. 2B and 2BB, first Z-fold line 212 is above line 216.

The Z-fold 218 may range in width from about 15 mm to about 75 mm, although the exemplary embodiment is shown having a width of 25 mm. The exposed material to the right of the Z-fold 218 in the figures may range from about 10 mm to about 50 mm in width.

Next, the Z-folded fabric blank 230 is folded in half along a first traverse fold line 220 (shown in FIGS. 2B and 2BB), that is parallel to the top 202 and bottom 204 edges. The first traverse fold line 220 bisects the Z-folded fabric blank 230 to create an upper half portion 232 and a lower half portion 234. The upper half portion 232 is folded so that it is located below the bottom half portion 234, resulting in a bi-folded fabric blank 250 shown in FIGS. 2C and 2CC.

The bi-folded fabric blank 250 is further folded in half to create a quad-folded blank 270 along a second traverse fold line 222, as shown in FIGS. 2C and 2CC, that is parallel to the top 202 and bottom 204 edges and the first traverse fold line 220. The second traverse fold line 222 bisects the bi-folded fabric blank 250 to create an upper quarter portion 252 and a lower quarter portion 254. The upper quarter portion 252 is folded so that it is located below the bottom quarter portion 254, resulting in a quad-folded fabric blank 270 shown in FIGS. 2D and 2DD.

Figure 6:
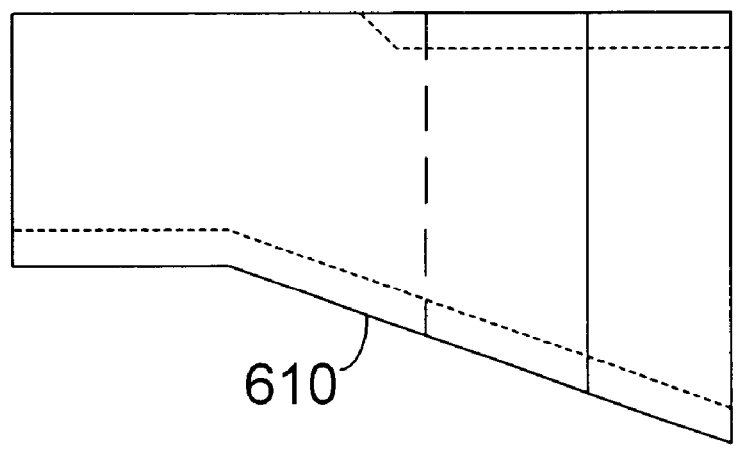
FIG. 6 is another exemplary embodiment of the invention.

Finally, the quad-folded fabric blank 270 may be sewn into place using one or more stitch lines, such as, for example, a first stitch line 242 and a second stitch line 244 to create and secure the fabric valve 200. The stitch lines 242 and 244 may be of any suitable stitch design, such as, for example, a lock stitch. A single needle, such as, for example, a 140/22 needle, may be used to create the lock stitch. The start and end of the lock stitch may be about two mm from the top and bottom edges of the quad-folded fabric blank 270. The stitch density may be, for example, about 10 to 12 threads per 25 mm, and may use, for example, IAW FED STD 751A TYPE 301. The stitch lines 242 and 244 may be of suitable geometry to handle internal pressure of the valve. For example, FIG. 6 shows a different stitch line configuration.

Figure 3:
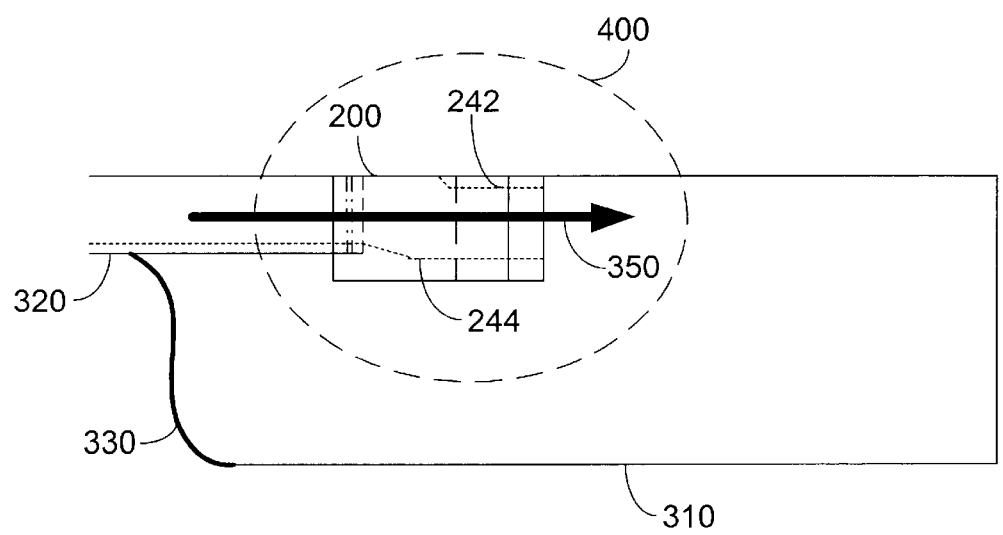
FIG. 3 is a schematic diagram showing how the fabric valve shown in FIG. 1 may be attached in an inflatable tubular structure.

The fabric valve 200 may be attached in position with respect to an ITS 310, as shown in FIG. 3. For example, fabric valve 200 may be attached to the ITS 310 by sewing. The ITS 310 may have a bladder having a stretchable portion 330 that expands as gas enters the ITS 310 through an inlet tube 320 and the fabric valve 200 in direction 350. Once the gas has entered into the ITS 310 as shown by arrow 350, the gas is prevented from exiting back out of the inlet tube 320 by the fabric valve 200 which prevents gas backflow.

The stitch lines 242 and 244 are attached, for example by sewing, onto the ITS 310. The inlet tube 320 is inserted within the body member 420 in a hole created by the fabric valve 200. The inlet tube 320 is inserted into the fabric valve 200 to a depth that would not interfere with the Z-fold member 410. Specifically, the Z-fold member 410's moving lip mechanism (see FIG. 4) is not interfered with by the inlet tube 320.

Figure 4:
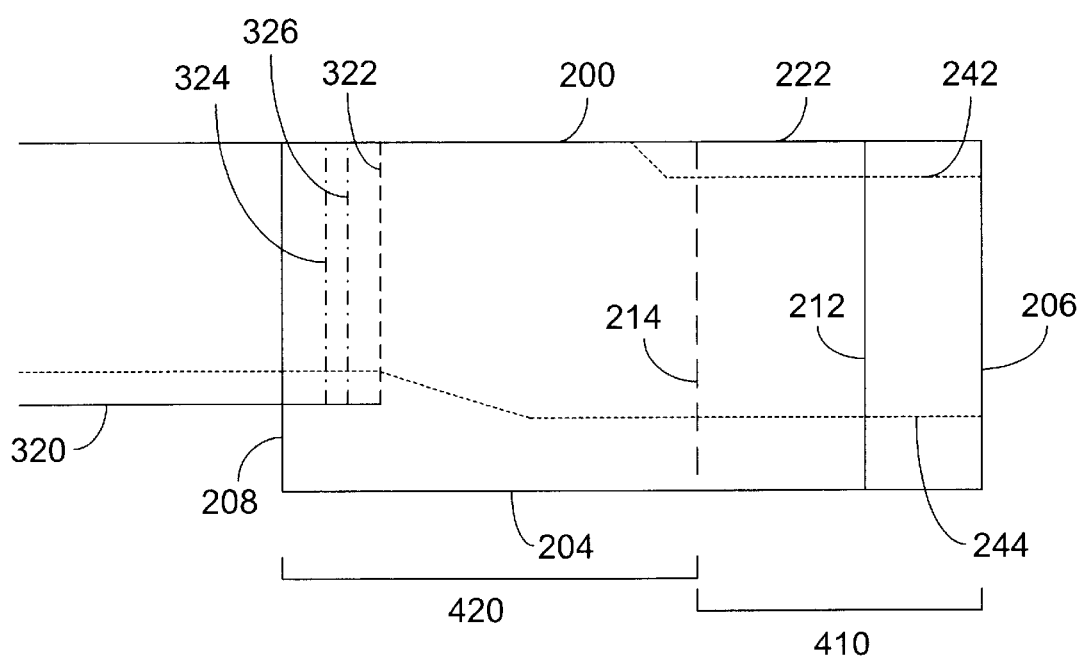
FIG. 4 is an expanded view of area 400 indicated in FIG. 3.

Referring to FIG. 4, the first stitch line 242 may be from about two mm to about 15 mm, for example, approximately five mm, from the fold line 222. The length of the first stitch line 242 depends upon the length of the Z-fold 218, and should extend past line 214. For example, the first stitch line 242 could be about 50 mm long and slope upward and end at fold line 222. The first stitch line 242 could range in length from about 25 mm to about 125 mm.

The position of the second stitch line 244 depends upon seam geometry, but should be from about ten mm to about 20 mm, for example, about 12 mm, from the bottom edge 204 within the Z-fold member 410. The length of the second stitch line 244 depends upon seam geometry and the length of the member 410 and/or 420. The second stitch line 244 may, for example, extend approximately 75 mm along the bottom edge 204 from the right edge 206, before sloping upward and crossing lines 326 and 324 and communicating with inlet tube 320. Within the body member 420, the location of the second stitch line 244 depends upon valve and seam geometry. For example, the second stitch line 244 may be about 24 mm from the bottom edge, although it could range between about ten mm and about 75 mm.

Although the description of FIGS. 2–4 were made with specific dimensions, such dimensions are only exemplary, and are not intended to be limiting. Thus, one having ordinary skill in the art would change the dimensions accordingly to fit a particular geometry of ITS or inlet tube.

The fabric valve 200 may be attached onto the inlet tube 320 in one of several ways. For example, as shown in FIG. 4, fabric valve 200 may be secured with the inlet tube 320 through various stitches 324 and 326 that prevent relative movement of the fabric valve 200 with respect to the inlet tube 320. As shown in FIG. 4, the front edge 322 of the inlet tube 320 stops short of the Z-fold line 214, thereby eliminating any interference between the inlet tube 320 and the moving lip mechanism of the fabric valve 200. Clamps, rivets, and other fasteners may be used to secure the fabric valve 200 onto the inlet tube 320.

An exemplary method for making the exemplary embodiment of the present invention described above comprises the following steps. The valve begins as a flat blank of material of appropriate size for the application. A single Z-fold is made and temporarily clipped at one end of the fabric blank. The blank is then folded in half perpendicular to the original Z-fold, and then folded in half again to result in a blank one-quarter the size of the original Z-folded blank. Finally, the valve is sewn closed in a configuration according to its particular application.

The valve works by creating a resistance to the backflow of the gas. This resistance is created by a moving lip seal mechanism, which allows unidirectional flow by pinching closed when pressure is applied on the downstream side of the valve. The folding and sewing of the valve material results in a more rigid section in the valve (a lip) which opens with pressure from the upstream side, but closes when downstream pressure exceeds the upstream pressure.

Figure 5:
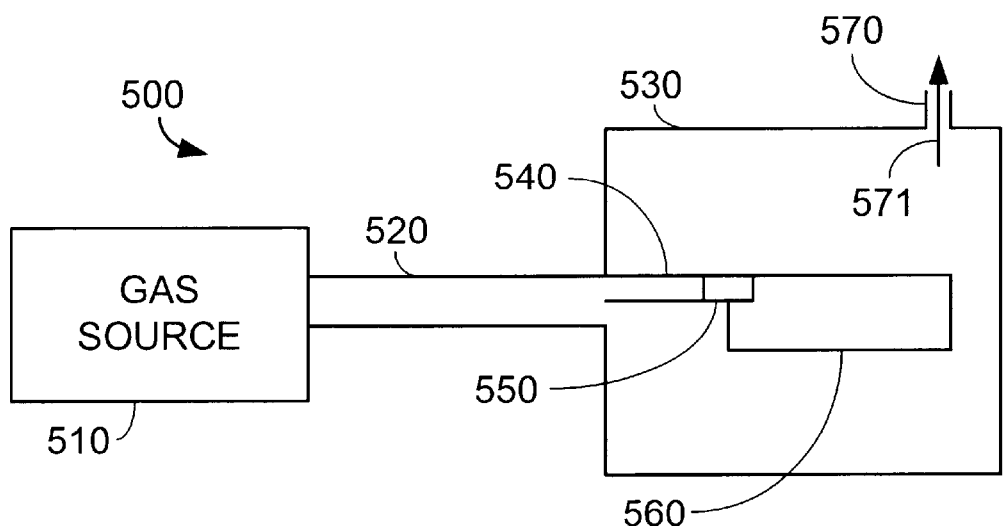
FIG. 5 is a schematic diagram of the fabric valve between two gas chambers in an inflatable vehicular safety system.

As shown in FIG. 5, an inflatable vehicular safety system 500 includes a source of gas 510, which typically is compressed gas or a gas generator. Upon sensing an impact, a signal triggers the release of gas from the gas source 510 through a gas conduit 520 to a chamber 530, which may be an inflatable safety device, such as, for example, a curtain style air bag or the like. Another chamber 560 may be in communication with chamber 530. The second chamber 560 may be, for example, an ITS or another inflatable structure. Gas may enter the second chamber 560 through a fill tube 540. Attached to the fill tube 540 may be a fabric valve 550, as described above. During operation, compressed gas may be released from the gas source 510, thereby flowing to and inflating both chambers 530 and 560. Gas in chamber 530 may leak out in the direction of arrow 571 to the ambient environment through gas escape point 570. Thus, gas in chamber 530 remains at a higher than ambient pressure for a relatively short amount of time. For example, a conventional air bag remains inflated for about a second before deflating. However, gas that enters chamber 560 through fill tube 540 is prevented from escaping by fabric valve 550, as described above.

Although the above system and fabric valve have been described with respect to a vehicular safety system, the present invention is not limited to only vehicles, and may be used wherever such an inflatable system may be used. Furthermore, such a fabric valve and system may be used to prevent the back flow of gas in an undesired path.

Furthermore, the above valve geometry shown in FIGS. 1–4 is only exemplary and is not intended to be limiting of the present disclosure. For example, the valve shown in FIG. 6 is another exemplary embodiment of the valve and is shown with a slope 610 on one side of the valve body. Other geometries for the valve that substantially perform the same functions of the valve described above also are within the scope of this invention.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A fabric valve comprising:
    a fabric blank having a top edge, a left edge, a bottom edge, and a right edge, wherein a Z-fold is created along the right edge to result in a Z-folded fabric blank, wherein the Z-folded fabric blank is folded in half along a first traverse fold line that is parallel to the top and bottom edges to result in a bi-folded fabric blank, wherein the bi-folded fabric blank is further folded in half along a second traverse fold line that is parallel to the top and bottom edges and the first traverse fold line to result in a quad-folded fabric blank;
    a first line of stitches parallel to the second traverse fold line, wherein the first line of stitches secures a portion of the Z-fold at the second traverse fold line; and
    a second line of stitches parallel to the first line of stitches, wherein the second line of stitches secures another portion of the Z-fold at the first traverse fold line, the top edge, and the bottom edge,
    wherein a fluid is restricted to flow through the quad-folded fabric blank substantially only in one direction.

2. The fabric valve of claim 1, wherein the Z-fold is from about 15 mm to about 75 mm wide.

3. The fabric valve of claim 1, wherein the Z-fold is approximately 25 mm wide.

4. The fabric valve of claim 1, wherein one of the first line of stitches and the second line of stitches comprises a lock stitch.

5. A fabric valve comprising:
    a body member having four layers of a fabric blank;
    a Z-fold member having twelve layers of the fabric blank, wherein four of the layers are extensions of the body member;
    a first line of stitches extending along a top portion of the Z-fold member; and
    a second line of stitches extending along a bottom portion of the Z-fold member and the body member,
    wherein a fluid is restricted to flow from the body member to the Z-fold member.

6. The fabric valve of claim 5, wherein the first line of stitches is located from about two mm to about 15 mm from a top edge of the fabric valve.

7. The fabric valve of claim 6, wherein the first line of stitches is located approximately five mm from the top edge of the fabric valve.

8. The fabric valve of claim 5, wherein the first line of stitches is from about 25 mm to about 125 mm long.

9. The fabric valve of claim 8, wherein the first line of stitches is approximately 50 mm long.

10. The fabric valve of claim 5, wherein the second line of stitches is located along a bottom edge of the fabric valve, wherein the second line of stitches is from about ten mm to about 20 mm from the bottom edge within the Z-fold member, and from about ten mm to about 75 mm from the bottom edge within the body member.

11. The fabric valve of claim 10, wherein the second line of stitches is approximately 12 mm from the bottom edge within the Z-fold member and approximately 24 mm from the bottom edge within the body member.

12. A method for making a fabric valve comprising the steps of:
    selecting a fabric blank having a top edge, a right edge, a bottom edge, and a left edge;
    creating a Z-fold along the right edge to result in a Z-folded blank;
    folding the Z-folded blank in half along a first traverse line perpendicular to the Z-fold to result in a half-size Z-folded blank;
    folding the half-size Z-folded blank in half along a second traverse line perpendicular to the Z-fold to result in a quarter-size Z-folded blank;
    securing the quarter-size Z folded blank along the second traverse line from the right edge across at least a width of the Z-fold; and
    securing the quarter-size Z folded blank along the first traverse line across at least the width of the Z-fold.

13. The method of claim 12, wherein the step of securing uses a lock stitch.

14. An inflatable vehicular safety system comprising:
    a first chamber adapted to receive gas from a gas generator;
    a fabric valve having a body member and a Z-fold member, wherein the body member is adapted to receive a portion of the gas from the gas generator and to discharge the portion of gas out of the Z-fold member, and wherein a first line of stitches extends along a top portion of the Z-fold member and a second line of stitches extends along a bottom portion of the Z-fold member and the body member; and
    a second chamber in fluid communication with the fabric valve, wherein the second chamber receives the portion of gas from the gas generator through the fabric valve, wherein when the first chamber experiences a decrease in pressure, the Z-fold member prevents gas in the second chamber from escaping the second chamber.

15. The system of claim 14, wherein the first chamber is a curtain air bag.

16. The system of claim 14, wherein the second chamber is an inflatable tubular structure.

17. The system of claim 14, wherein the first line of stitches is located from about two mm to about 15 mm from a top edge of the fabric valve and the second line of stitches is located from about ten mm to about 75 mm from a bottom edge of the fabric valve.

18. The fabric valve of claim 17, wherein the first line of stitches is approximately five mm from the top edge of the fabric valve and the second line of stitches is approximately 12 mm from the bottom edge of the fabric valve.

19. The system of claim 14, wherein the fabric valve is attached to the second chamber at the body member using one or more lock stitches.

20. The system of claim 14, wherein the body member comprises four layers of a fabric blank.

21. The system of claim 20, wherein the Z-fold member comprises twelve layers of the fabric blank.

22. The system of claim 14, wherein the Z-fold member has a width of about 25 mm.

23. A fabric valve comprising:
    a body member having a first plurality of layers of a fabric blank;
    a Z-fold member having a second plurality of layers of the fabric blank, wherein part of the second plurality of layers includes extensions of the first plurality of layers of the body member;
    a first line of stitches extending along a top portion of the Z-fold member; and
    a second line of stitches extending along a bottom portion of the Z-fold member and the body member,
    wherein a fluid is restricted to flow from the body member to the Z-fold member.

24. The fabric valve of claim 23, wherein the first line of stitches is located from about two mm to about 15 mm from a top edge of the fabric valve.

25. The fabric valve of claim 24, wherein the first line of stitches is approximately five mm from the top edge of the fabric valve.

26. The fabric valve of claim 24, wherein the first line of stitches is from about 25 mm to about 125 mm long.

27. The fabric valve of claim 26, wherein the first line of stitches is approximately 50 mm long.

28. The fabric valve of claim 23, wherein the second line of stitches is located along a bottom edge of the fabric valve, wherein the second line of stitches is from about ten mm to about 20 mm from the bottom edge within the Z-fold member and from about ten mm to about 75 mm from the bottom edge within the body member.

29. The fabric valve of claim 28, wherein the second line of stitches is approximately 12 mm from the bottom edge within the Z-fold member and approximately 24 mm from the bottom edge within the body member.

* * * * *